United States Patent
Cacioppo (10) Patent No.: US 9,999,013 B2
(45) Date of Patent: Jun. 12, 2018

(54) TWO-DIMENSIONAL CODE-DRIVEN METHOD AND SYSTEM FOR SYNCHRONIZING WIRELESS DEVICES WITH A COMPUTING DEVICE

(71) Applicant: MIMIO, LLC, Cambridge, MA (US)

(72) Inventor: Christopher M. Cacioppo, Somerville, MA (US)

(73) Assignee: Mimio, LLC, Lawrenceville, GA (US)

( * ) Notice: Subject to any disclaimer, the term of this patent is extended or adjusted under 35 U.S.C. 154(b) by 0 days. days.

(21) Appl. No.: 14/762,397

(22) PCT Filed: Jan. 22, 2014

(86) PCT No.: PCT/GB2014/050167
§ 371 (c)(1),
(2) Date: Jul. 21, 2015

(87) PCT Pub. No.: WO2014/114930
PCT Pub. Date: Jul. 31, 2014

(65) Prior Publication Data
US 2015/0365909 A1 Dec. 17, 2015

Related U.S. Application Data

(60) Provisional application No. 61/755,202, filed on Jan. 22, 2013.

(51) Int. Cl.
| | | |
|---|---|---|
| *H04L 12/28* | (2006.01) | |
| *H04W 56/00* | (2009.01) | |
| *G09B 7/02* | (2006.01) | |
| *H04W 4/00* | (2018.01) | |
| *H04W 12/06* | (2009.01) | |
| *G09B 5/02* | (2006.01) | |
| *G09B 7/00* | (2006.01) | |
| *H04W 76/02* | (2009.01) | |

(52) U.S. Cl.
CPC ............ *H04W 56/002* (2013.01); *G09B 5/02* (2013.01); *G09B 7/00* (2013.01); *G09B 7/02* (2013.01); *H04W 4/008* (2013.01); *H04W 12/06* (2013.01); *H04W 76/023* (2013.01)

(58) Field of Classification Search
CPC . H04W 56/002; H04W 76/023; H04W 12/06; H04W 4/008; G09B 5/02; G09B 7/00; G09B 7/02
See application file for complete search history.

(56) References Cited

U.S. PATENT DOCUMENTS

2003/0028599 A1 2/2003 Kolsky
2008/0039063 A1 2/2008 Ichieda
(Continued)

OTHER PUBLICATIONS

Jin et al. ("Interaction Between Small Size Device and Large Screen in Public Space", Knowledge-Based Intelligent Information and Engineering Systems, Springer Berlin Heidelberg, KES 2006, Part III, pp. 197-204, 2006).*

(Continued)

*Primary Examiner* — Clemence Han
(74) *Attorney, Agent, or Firm* — Sherman IP LLP; Kenneth L. Sherman; Steven Laut (57) ABSTRACT

A 2D code-driven method and system provides for synchronizing camera-equipped wireless computing devices with a centralized computing device to facilitate interactive educational activities.

11 Claims, 6 Drawing Sheets

(56) References Cited

U.S. PATENT DOCUMENTS

| | | | |
|---|---|---|---|
| 2009/0015515 A1 | 1/2009 | Ichieda | |
| 2012/0280783 A1* | 11/2012 | Gerhardt | G07C 9/00309 340/5.6 |
| 2013/0167208 A1* | 6/2013 | Shi | H04L 63/18 726/5 |
| 2013/0219479 A1* | 8/2013 | DeSoto | H04W 12/06 726/6 |
| 2013/0221084 A1* | 8/2013 | Doss | H04W 12/06 235/375 |
| 2014/0001253 A1* | 1/2014 | Smith | G06Q 20/3276 235/375 |
| 2014/0013100 A1* | 1/2014 | Menzel | H04N 21/43637 713/150 |
| 2015/0242618 A1* | 8/2015 | Itskov | G06F 21/44 463/29 |
| 2015/0348329 A1* | 12/2015 | Carre | G06Q 30/02 345/633 |

OTHER PUBLICATIONS

International Search Report for Application No. PCT/GB2014/050167, dated Jul. 3, 2014.
Written Opinion for Application No. PCT/GB2014/050164, dated Jul. 3, 2014.

* cited by examiner

TWO-DIMENSIONAL CODE-DRIVEN METHOD AND SYSTEM FOR SYNCHRONIZING WIRELESS DEVICES WITH A COMPUTING DEVICE

CROSS-REFERENCE TO RELATED APPLICATION

The present application is the U.S. national phase of International Patent Application No. PCT/GB2014/050167, filed Jan. 22, 2014, which application claims priority to U.S. Provisional Patent Application No. 61/755,202, filed Jan. 22, 2013. The priority application, U.S. 61/755,202, is hereby incorporated by reference.

TECHNICAL FIELD

The present disclosure provides several embodiments of a two-dimensional code-driven method and system for synchronizing a plurality of camera-equipped wireless computing devices with a centralized computing device to facilitate interactive educational activities.

BACKGROUND

Audience response systems (ARS), in which group members use camera-equipped wireless computing devices to vote on topics, answer questions and confirm attendance are commonly used today to facilitate group interaction. Audience response systems can be employed for a variety of purposes and in various types of group environments. As one example, audience response systems are used by teachers in a classroom setting (e.g., to take attendance, or to administer tests and quizzes), and research indicates that there are various benefits to using audience response systems in such a setting. For instance, audience response systems in classrooms have been shown to improve attentiveness, increase knowledge retention and generally create a more enjoyable classroom environment and contribute to a more positive learning experience.

In a typical audience response system architecture, multiple computing devices associated with different users communicate wirelessly, e.g., using radio frequency or infrared communication technology, with one or more wireless aggregation points that generally collect and, possibly, process the data communicated by the audience via the camera-equipped wireless computing devices. A wireless aggregation point is typically (but not always) communicatively coupled to a centralized computing device, such as a personal computer, that runs a program which generally controls the operation of the audience response system. That is, the centralized computing device may be used to process information received from the computing devices and to determine what information is sent to the computing devices. Historically, audience response systems have used proprietary computing devices supplied and configured by the manufacturer. However, with the prevalence of camera-equipped wireless computing devices, such as smart phones, tablets, and laptops many institutions are instituting a bring your own device (BYOD) policy in order to reduce or remove the need to purchase proprietary computing devices from manufacturers and to allow students to use devices with which they are familiar and comfortable.

In order for an audience response system to function properly and effectively, however, the computing devices typically need to be configured to operate together in an efficient manner, and without interfering with one another. As a result, teachers may end up spending significant time configuring and reconfiguring computing devices, or even just verifying that the configuration of each computing device is proper. This may render the audience response system prohibitively inefficient and its use unjustified.

Accordingly, audience response system manufactures have been faced with the challenge of developing a method for students to simply and quickly connect their wireless computing devices, many of which happen to be digital camera-equipped, to a teacher's centralized computing device in the classroom. Most of these camera-equipped wireless computing devices connect through a standard wireless network, as per IEEE 802.11, IEEE 802.16, or other wireless communication protocols and standards, though some camera-equipped wireless computing devices are connected to a cellular network.

Prior art systems have used methods where a teacher provides an IP address and other configuration parameters to students by posting them on a sign, providing them on a piece of paper, or reading them aloud. The students then have to manually type this information into their camera-equipped wireless computing device. However, prior art systems have numerous short comings. Depending on the network structure, a teacher may have to provide not only an IP address and a password, but port configurations. Manually entering configuration parameters is time consuming and error-prone, as one student's typing error can delay an entire class. Furthermore, once the students are connected to the wireless network, they still must find or "discover" the centralized computing device and configure their wireless computing device to connect with the centralized computing device in order to exchange information with a that centralized computing device, e.g. a host computer. Because many students and teachers are still uncomfortable with configuring individual wireless computing devices, entering so much configuration parameters leads to frustration and causes students to lose interest. Moreover, because students have classes in many different classrooms throughout the day, the accumulated time spent configuring their wireless computing devices for each class during the course of a school day reduces the amount of time students are actually able to take advantage of the audience response systems and participate in other learning activities.

Another prior art method includes a centralized computing device to broadcast connection information to a plurality of wireless computing devices and has the students choose the computer they want to connect to and type in a password. Many networks, however, prevent broadcasting from all or most computers to maintain network reliability and security and therefore this method does not always work in a classroom environment. Yet another prior art method functions in reverse, and uses the students' wireless computing devices to broadcast connection information to the control system. This method is even more time consuming and still suffers from the problems listed above.

SUMMARY

Traditionally barcodes, such as Quick Response (QR®) codes, have been used to encode and transmit a uniform resource locator (URL) to a camera-equipped mobile device. This use, however, does not address many of the problems which are unique to the classroom environment. First of all, when use of a QR® code to connect to a URL does not establish a direct connection between devices, but rather, allows the camera-equipped mobile device to connect to a central device over the Internet. Those skilled in the art will appreciate the significance of the differences between these two connection types. Additionally, when using a QR® code to connect to a URL, the student's device must already be connected to the network. As discussed above, however, having to wait while an entire classroom of students enters an IP address can be burdensome and time-consuming. Similarly, using a QR® code to transmit a URL does not create a secure direct connection between a student's device and a central computer. As a result, communications between the two devices are capable of being seen by users of other devices. For example, in a classroom environment where a plurality of students each use a computing device to connect to a central computer controlled by a teacher, the teacher may display a question on, for example, an electronic whiteboard. The student may wish to answer the question using the computing device, but in a manner that does not permit other students to see the answer the student has selected. Likewise, the teacher may wish to provide instruction or correction to one or more individual students, without letting the other students see. Parents may be hesitant to allow classroom technologies which can be accessed by unapproved third parties or which allow other students to see their child's answer and potential ridicule their child for having an incorrect answer. This is especially useful in the classroom environment where students, teachers and parents may prefer a system that is secure and that fosters learning while minimizing effects of peer pressure.

If these problems with prior art systems can be overcome, a bring-your-own-device (or BYOD) audience response system may reduce the effect of crowd psychology because, unlike hand raising, audience response systems may prevent students from seeing the answers of other students. For similar reasons, audience response systems may reduce instances of cheating in the classroom. Furthermore, audience response systems typically allow faster tabulation and display of answers and a more efficient tracking of individual responses and other data (e.g., response times of individual students).

Like reference numbers and designations in the various drawings indicate like elements. Furthermore, when individual elements are designated by references numbers in the form $N_M$, these elements may be referred to collectively by N. For example, FIG. 1 illustrates handsets $104_1$, $104_2$, . . . , and two or more of such handsets may be referred to collectively as handsets 104.

DETAILED DESCRIPTION

Overview of an Example Audience Response System

Figure 1:
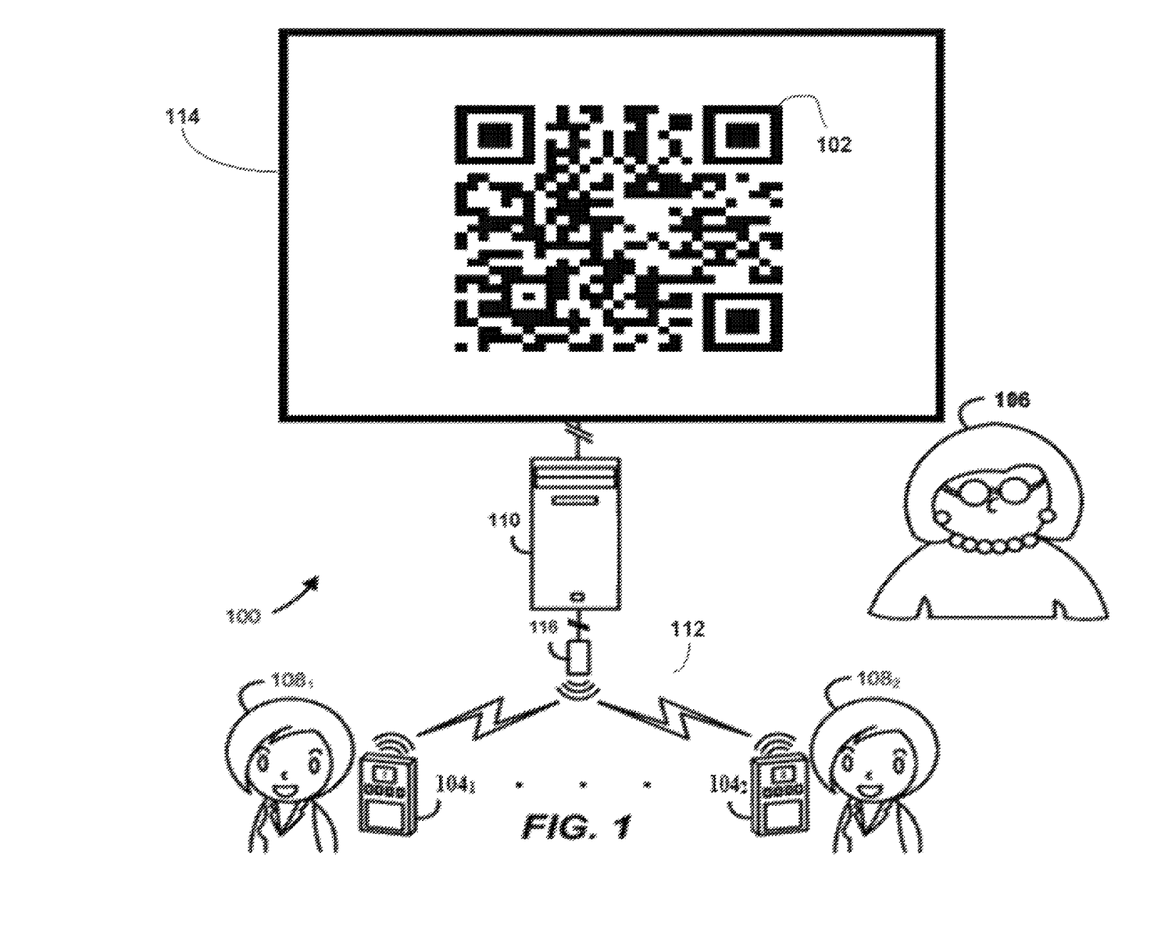
FIG. 1 is a block diagram illustrating an example audience response system using a two-dimensional code to synchronize a plurality of digital camera-equipped wireless computing devices with a centralized computing device.

FIG. 1 is a block diagram illustrating an example audience response system 100 using two-dimensional code 102 for synchronizing a plurality of camera-equipped wireless computing devices 104 which may include, by way of example only, smart phones, tablet computers, laptop, personal gaming devices, and personal music storage and playback devices. For ease of explanation, various components of the example audience response system 100 (and similar systems) will be described in the context of a classroom environment, where a teacher 106 may interact with one or more students 108 using the audience response system 100. However, it will be understood by one of ordinary skill in the art that the example audience response system 100, as well as individual components thereof, may be used in other settings (e.g., corporate training or focus groups).

The example audience response system 100 includes multiple camera-equipped wireless computing devices 104 running an audience response application that may be used by students 108 to answer questions (e.g., posed by a teacher 106), vote on a topic, confirm attendance, and so on. In order for the audience response system 100 to function properly and effectively, the camera-equipped wireless computing devices 104 need to communicate with the centralized computing device 110. Typically, the camera-equipped wireless computing device 104 connects to the centralized computing device 110 through a wireless network 112. Furthermore, once connected to the wireless network 112, the plurality of camera-equipped wireless computing devices 104 and the centralized computing device 110 need to find or "discover" each other in order to exchange information. Accordingly, configuring the camera-equipped wireless computing device 104 to connect to the wireless network 112 involves determining one or more configuration parameters associated with the network 112 and the centralized computing device 110. Operating parameters associated with a given wireless network 112 may include one or more IP addresses, one or more network ports, and one or more password hashes. Operating parameters associated with a given centralized computing device 110 may include a unique (or a quasi-unique) centralized computing device identifier (ID) that identifies the centralized computing device, in order to establish a communication link with the centralized computing device 110.

Accordingly, centralized computing device 110 may create one or more two-dimensional codes 102, such as a matrix two-dimensional code, quick response (QR®) code, or UPC two-dimensional code, otherwise known as a barcode, containing the network configuration parameters and centralized computing device configuration parameters. The centralized computing device 110 can then display this two-dimensional code 102 to the one or more students 108 via a display 114. The display 114 can be a display screen, a projector screen, a piece of paper. Alternatively, the two-dimensional code 102 can be otherwise distributed to the students 108. The students 108 may then use a code recognition functionality of the audience response application running on the camera-equipped wireless computing device 104 to scan the two-dimensional code 102, extract metadata from the two-dimensional code 102 representing the network configuration parameters and centralized computing device configuration parameters. The audience response application may be, for example, a web application, a native application (locally stored and executed on the camera-equipped mobile computing device), or a combination of the two. Once one or more camera-equipped wireless computing devices 104 have retrieved the network configuration parameters and centralized computing device configuration parameters, the camera-equipped wireless computing device 104 may connect to the network 112 and use the centralized computing device configuration parameters to "discover" or determine the location of the centralized computing device 110 on the network 112. Once the camera-equipped wireless computing device 104 has located the centralized computing device 110, the camera-equipped wireless computing device 104 may send a request to establish a direct connection with the centralized computing device 110.

Generally, the camera-equipped wireless computing devices 104 may be configured to run the audience response application in order to receive user input data (such as answers to a multiple-choice questions) from students 108 and to communicate the user input data wirelessly (e.g., as per IEEE 802.11, IEEE 802.16, or other wireless communication protocols and standards) to one or more wireless aggregation points 116. A wireless aggregation point 116 may be coupled to the centralized computing device 110, may be a standalone wireless aggregation point 116, or a combination thereof.

The term "wireless aggregation point" is used here broadly to denote any device (or a combination of devices) that is capable of sending information to and/or receiving information from multiple camera-equipped wireless computing devices 104 (thus making the multiple camera-equipped wireless computing devices 104 capable of operating simultaneously, or substantially simultaneously). Examples of a wireless aggregation point 116 include base stations, RF USB/Serial dongles, IR USB/Serial dongles and wireless access points (as per IEEE 802.11, IEEE 802.16, or other wireless communication protocols and standards).

The term "centralized computing device" is also used here broadly to denote any device (or a combination of devices) that is capable of processing data received from the camera-equipped wireless computing devices 104. In the example audience response system 100 illustrated in FIG. 1, the centralized computing device 110 displays a two-dimensional code 102 that contains network configuration parameters and centralized computing device configuration parameters which can be used by the camera-equipped wireless computing device 104 to connect to the network 112 and establish a direct connection with the centralized computing device 110. However, it will be understood, that the two-dimensional code 102 may be distributed in other ways than those shown in FIG. 1, such as on a piece of paper provided at a student's desk or on a class syllabus.

Much of the functionality of the audience response application running on the camera-equipped wireless computing device 104 may be implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the example embodiments provided herein.

Example Centralized Computing Device

Figure 2:
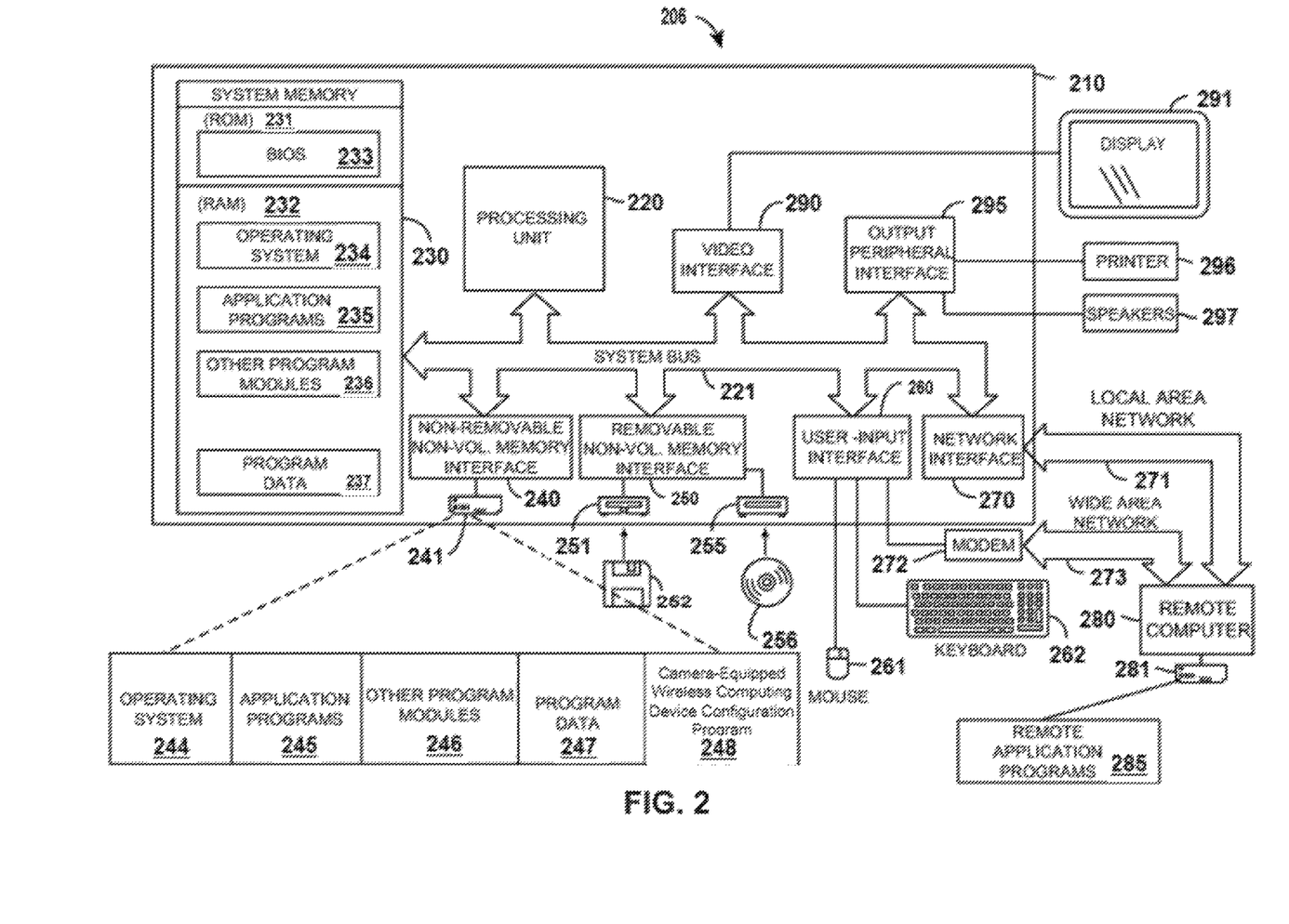
FIG. 2 is a block diagram illustrating the architecture of an example digital camera-equipped wireless computing device for use in an audience response system.

FIG. 2 is a block diagram of an example architecture of a centralized computing device 206. The example centralized computing device 206 may be utilized in the audience response system 100 illustrated in FIG. 1 or may be alternatively used in other audience response systems, and the audience response system 100 illustrated in FIG. 1 may utilize a centralized computing device 206 that has an architecture that is different from that of the centralized computing device 206 illustrated in FIG. 2.

Components of the centralized computing device 206 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Centralized computing device 206 typically includes a variety of computer readable media. Computer readable media can be any available media that can be accessed by centralized computing device 206 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, solid state, magnetic disk storage or other magnetic storage devices, or any other medium which can be used to store the desired information and which can accessed by centralized computing device 206. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within centralized computing device 206, such as during start-up, is typically stored in ROM 231. RAM 232 typically contains data and/or program modules that are immediately accessible to and/or presently being operated on by processing unit 220. By way of example, and not limitation, FIG. 2 illustrates operating system 244, application programs 245, other program modules 246, program data 237, and a camera-equipped wireless computing device configuration program 248. It should be noted, however, that at least some of the program modules 244-248, such as the camera-equipped wireless computing device configuration program 248 may implemented, at least partially, by entities in an audience response system other than the centralized computing device 206. For example, the camera-equipped wireless computing device configuration program 248 may be distributed among the centralized computing device 206, and the wireless access point, among multiple centralized computing devices 206 and/or multiple wireless access points, and among other devices within an audience response system, including downloadable applications downloaded to the respective centralized computing devices 206 (if more than one, such as within a school or among several schools in a given school district) and even to the various camera-equipped wireless computing devices.

The centralized computing device 206 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2 provide storage of computer readable instructions, data structures, program modules and other data for the centralized computing device 206. In FIG. 2, for example, hard disk drive 241 is illustrated as storing operating system 244, application programs 245, other program modules 246, and program data 247. Note that these components can either be the same as or different from operating system 234, application programs 235, other program modules 536, and program data 237. Operating system 244, application programs 245, other program modules 546, and program data 247 are given different numbers here to illustrate that, at a minimum, they are different copies. A user may enter commands and information into the computer 20 through input devices such as a keyboard 262 and cursor control device 261, commonly referred to as a mouse, trackball or touch pad. A camera 263, such as web camera (webcam), may capture and input pictures of an environment associated with the centralized computing device 206, such as providing pictures of users. The webcam 263 may capture pictures on demand, for example, when instructed by a user, or may take pictures periodically under the control of the centralized computing device 206. Other input devices (not shown) may include a microphone, joystick, game pad, satellite dish, scanner, or the like. These and other input devices are often connected to the processing unit 220 through an input interface 260 that is coupled to the system bus, but may be connected by other interface and bus structures, such as a parallel port, game port or a universal serial bus (USB). A display 291, such as a projector or monitor, is also connected to the system bus 221 via an interface, such as a graphics controller 290. In addition to the display, computers may also include other peripheral output devices such as speakers 297 and printer 296, which may be connected through an output peripheral interface 295.

The centralized computing device 206 may store a code creation program on the computer storage media discussed above. The code creation program may allow a user, such as a teacher or IT professional, to input a plurality of configuration parameters, such as network configuration parameters and centralized computing device parameters. The code creation program may embed the parameters as metadata in a two-dimensional code. Those of ordinary skill in the art will appreciate that this is only one example of a way to create a two-dimensional code and that two-dimension codes can be created or obtained in a variety of ways.

The centralized computing device may be connected to one or more video output means such as the display 291, including a projector or a computer screen, via an audio visual interface such as VGA, HDMI or DVI. The centralized computing device may use the video output means to display a two-dimensional code to a plurality of users, who may scan the code using a camera functionality of a camera-equipped wireless computing device, as described in detail further below.

The centralized computing device 206 may operate in a networked environment using logical connections to one or more remote computers, such as a remote computer 280. The remote computer 280 may be a personal computer, a server, a router, a network PC, a peer device or other common network node, and typically includes many or all of the elements described above relative to the centralized computing device 206, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the centralized computing device 206 is connected to the LAN 271 through a network interface or adapter 270. When used in a WAN networking environment, the centralized computing device 206 typically includes a modem 272 or other means for establishing communications over the WAN 273, such as the Internet. The modem 272, which may be internal or external, may be connected to the system bus 221 via the input interface 260, or other appropriate mechanism. In a networked environment, program modules depicted relative to the centralized computing device 206, or portions thereof, may be stored in the remote memory storage device. By way of example, and not limitation, FIG. 2 illustrates remote application programs 285 as residing on memory device 281.

The communications connections 270, 272 allow the device to communicate with other devices. The communications connections 270, 272 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RE, infrared and other wireless media. Computer readable media may include both storage media and communication media.

Example Architecture of a Camera-Equipped Wireless Computing Device

Figure 3:
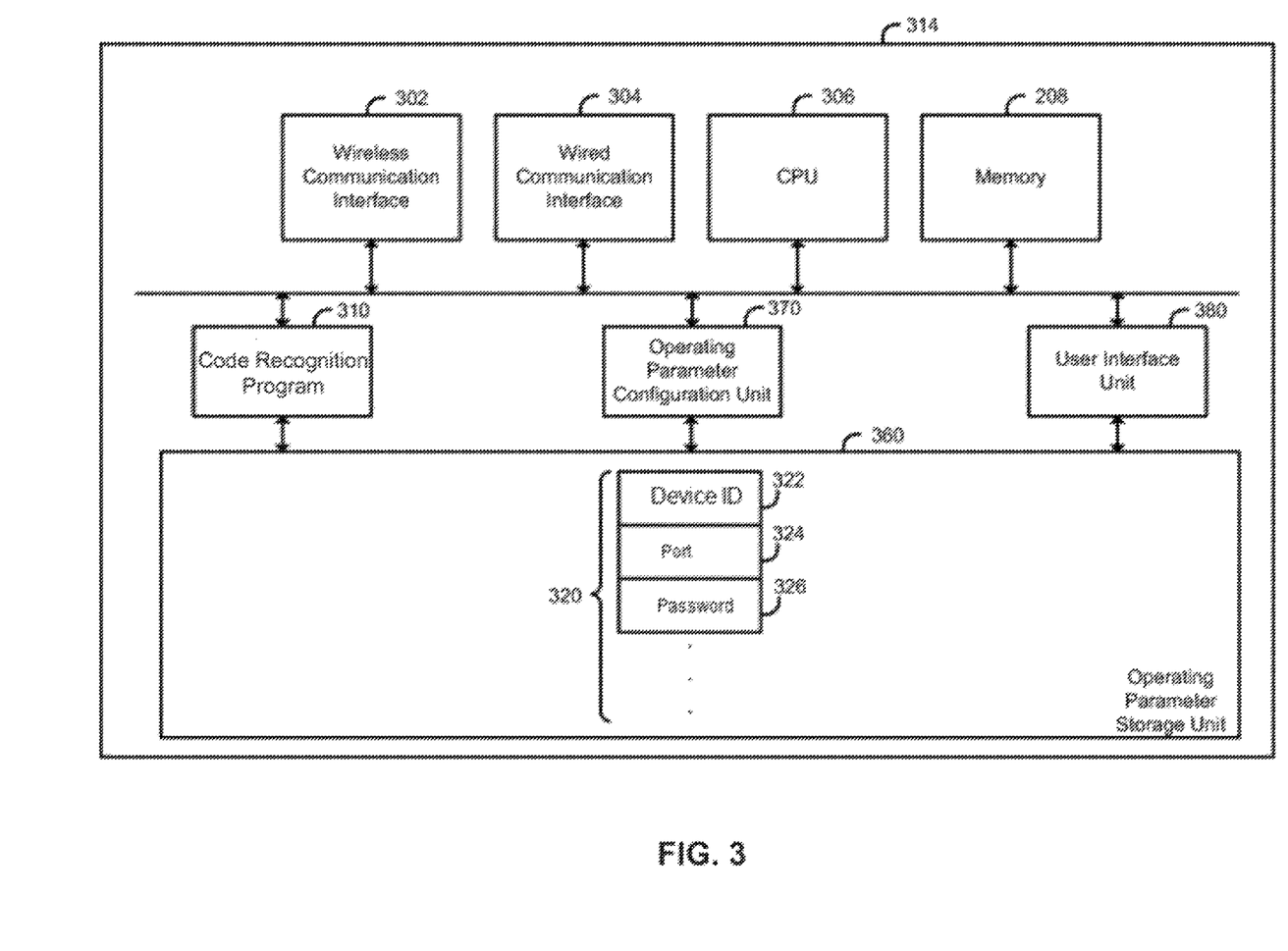
FIG. 3 is a block diagram illustrating an example architecture of a centralized computing device for use in an audience response system.

FIG. 3 is a block diagram illustrating the architecture of an example camera-equipped wireless computing device 314 utilized in the audience response system 100 illustrated in FIG. 1. The camera-equipped wireless computing device 314 may be any computing device which can be configured to connect to a wireless network such as a smart phone-type cell phone, tablet, personal gaming device, laptop or proprietary handset. Preferably, the camera-equipped wireless computing device 314 has built in camera capabilities, but may use an external camera such as over a universal serial bus (USB) port or Bluetooth® wireless connection. It will be understood, however, that the camera-equipped wireless computing device 314 may be alternatively used in other audience response systems, and that audience response system 100 illustrated in FIG. 1 may utilize a camera-equipped wireless computing device 114 having a different architecture from that of the camera-equipped wireless computing device 314 illustrated in FIG. 3.

The camera-equipped wireless computing device 314 may also include a central processing unit (CPU) 306 configured to execute computer readable instructions stored in a memory 308 coupled to the CPU 306 in order to implement at least some of the functions of the camera-equipped wireless computing device 314 described above. The camera-equipped wireless computing device 314 may store a audience response application in the memory 308 used to scan a two-dimensional code. The code recognition application can be executed by the CPU and uses the camera functionality of the camera-equipped wireless computing device to recognize a two-dimensional code and extract information from the scanned code, such as network configuration parameters and centralized computing device configuration parameters. Additionally, the camera-equipped wireless computing device 314 may store a audience response application in the memory 308, which when executed by the CPU allows the camera-equipped wireless computing device 314 to interact with the centralized computing device and/or other components of the audience response systems in a variety of ways. For examples, students 108 illustrated in FIG. 1 may use the camera-equipped wireless computing device 314 to answer questions (e.g., posed by a teacher 116 illustrated in FIG. 1), vote on a topic, confirm attendance, and so on.

The camera-equipped wireless computing device 314 includes an operating parameter storage unit 360 that stores data indicative of one or more operating parameters 320 of the centralized computing device and one or more operating parameters of the network, such as the operating parameters discussed in reference to FIG. 1 (e.g., centralized computing device ID 322, parameters 324 defining a communication channel such as a port, that the camera-equipped wireless computing device 314 can use to communicate with a Wireless aggregation point, one or more parameters 326 defining various passwords or keys that the camera-equipped wireless computing device 314 can use to establish a communication link with the Wireless aggregation point, and so on).

Additionally, the camera-equipped wireless computing device 314 includes an operating parameter configuration unit 370 that is generally configured to define the operating parameters 320 stored in the operating parameter storage unit 360.

In some embodiments, the operating parameter configuration unit 370 may receive data indicative of the operating parameters 320 from a two-dimensional code and update the values of its operating parameters 320 in response to, or based on, the received data. For example, if the operating parameter configuration unit 370 of the remote camera-equipped wireless computing device 314 receives data indicative of a value of a particular operating parameter 320 of the centralized computing device, the operating parameter configuration unit 370 may set the stored value of the operating parameter 320 in the operating parameter storage unit 360 to the received value. That is, for instance, if the operating parameter storage unit 360 of the camera-equipped wireless computing device 314 receives data that indicates that the value of centralized computing device ID 322 should be 15, the operating parameter configuration unit 370 may set the value of the centralized computing device ID in the operating parameter storage unit 360 of the camera-equipped wireless computing device 314 to 15.

In addition to the operating parameter configuration unit 370, the operating parameter storage unit 360 and the camera-equipped wireless computing device 314 may include a number of other units, or components. For example, the camera-equipped wireless computing device 314 may include one or more communication interfaces (e.g., a wireless communication interface 302 and a wired communication interface 304) for generally communicating with, for example, wireless aggregation points and centralized computing devices.

Additionally, the camera-equipped wireless computing device 314 may include a user interface unit 380 that will be described below. Generally, the user interface unit 380 provides a user interface of an application running on the camera-equipped wireless computing device 314, including the audience response application to enable a camera-equipped wireless computing device to scan a two-dimensional code. For example, the user interface unit 380 is configured to receive user input from a student and to scan a two-dimensional code indicative of the user input displayed on the display screen, such as the display 14 of FIG. 1. The user interface unit may also provide a user interface of an audience response application to enable a student to interact with the camera-equipped wireless computing device 314. For example, the user interface unit 380 is configured to receive user input from a student and to communicate data indicative of the user input to the wireless aggregation point, such as the wireless aggregation point 102 of FIG. 1.

Figure 4:
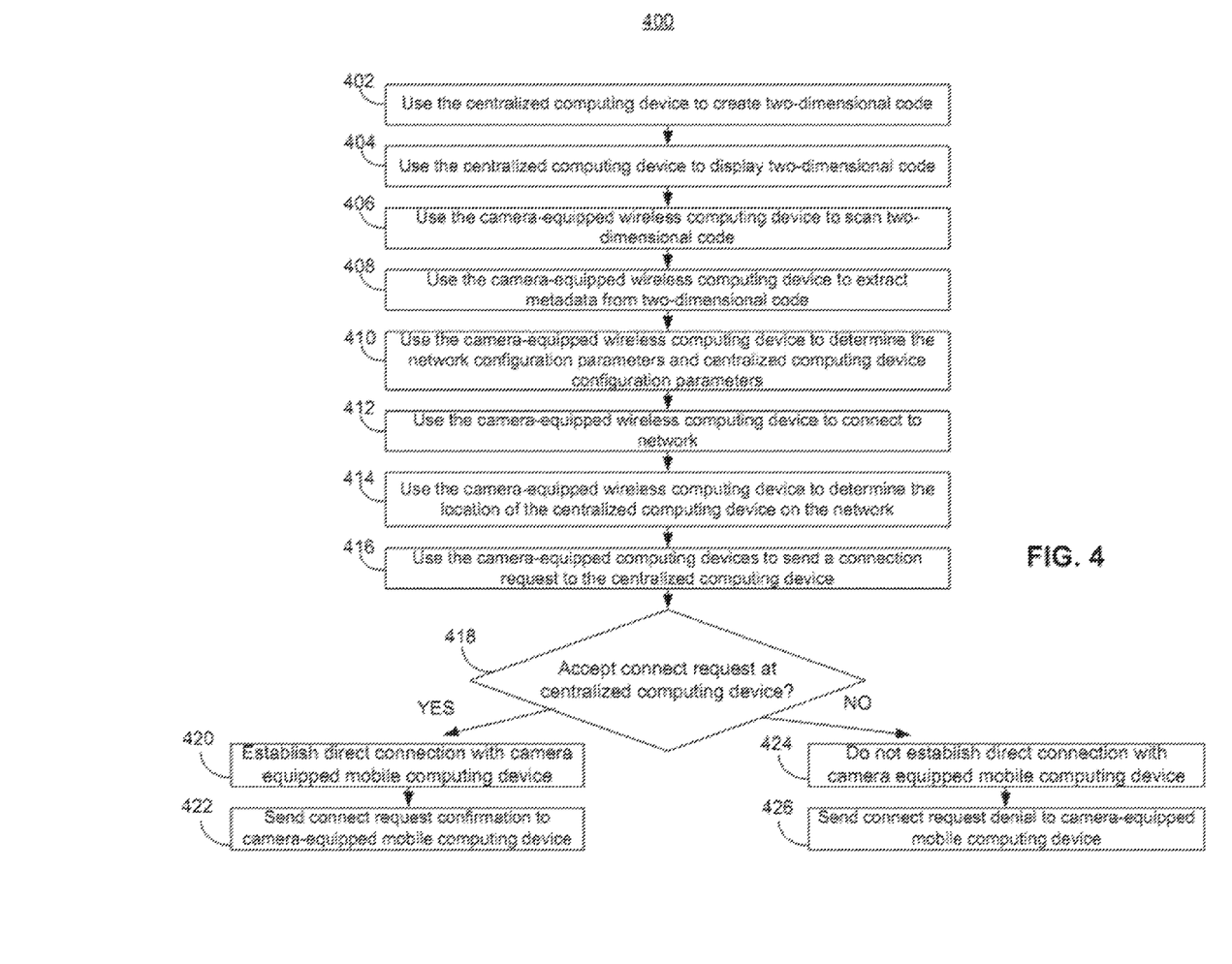
FIG. 4 is a flow chart illustrating an example method used by an example audience response system for synchronizing a plurality of digital camera-equipped wireless computing devices with a centralized computing device using a two-dimensional code.

FIG. 4 is a flowchart illustrating an example method 400 for use by a centralized computing device of an audience response system to use a two-dimensional code to synchronize a camera-equipped wireless computing device for use in the audience response system. For ease of explanation, FIG. 4 will be explained in references to FIGS. 1-3. However, it will be understood that the example method 400 for configuring a camera-equipped wireless computing device for use in an audience response system can be utilized with systems and devices other than those shown in FIGS. 1-3.

An audience response system includes a centralized computing device connected to a network (such as the central computing device and network referred to in FIG. 4). The centralized computing device creates a two-dimensional code containing information defining the configuration parameters of the network and the configuration parameters of the centralized computing device (block 402). Alternatively, the two-dimensional code can be created elsewhere and transferred to the centralized computing device. The centralized computing device causes the two-dimensional code to be displayed on a display screen (block 404). The centralized computing device projects the two-dimensional code in visible range of a plurality of camera-equipped wireless computing devices. For example, the two-dimensional code may be projected on a display device such as an electronic whiteboard display or a large-screen monitor in response to a command from the centralized computing device. Once the two-dimensional code is displayed, the camera-equipped wireless computing device may use the camera of the camera-equipped mobile computing device code recognition functionality of the audience response application to scan the two-dimensional code (block 406). After the wireless computing device scans the two-dimension code, the camera-equipped wireless computing device extracts metadata from the two-dimensional code (block 408) and determines the network configuration parameters and centralized computing device configuration parameters (block 410). The camera-equipped wireless computing device uses the extracted information to connect to a network such as the wireless network used by the centralized computing device in reference to FIG. 1 (block 412). The camera-equipped wireless computing device may connect to the network through, for example, a wireless aggregation point such as the wireless aggregation point used in FIG. 1).

Once connected to the network, the camera-equipped wireless computing device uses the centralized computing device configuration parameters to determine the location of the centralized computing device on the network (block 414). The camera-equipped computing devices then sends a connection request to the centralized computing device (block 416). The connection request may contain a network password (such as the network password defined in the network password field of the computing device configuration parameters of FIG. 6). The centralized computing device receives the connection request and decides whether to accept or deny the connection request (block 418). Furthermore, the centralized computing device may determine the validity of the network password included in the connection request. Those skilled in the art will recognize that a variety of password verification techniques may be used in the example method of FIG. 4 and will not be discussed for the sake of brevity. If the centralized computing device accepts the connection request ("YES" branch of block 418), the centralized computing device establishes the connection (block 420) and sends a connection request confirmation to the camera-equipped wireless computing device (block 422). If the centralized computing device denies the connection request ("NO" branch of block 420), the centralized computing device does not establish a connection (block 424) and sends a connect request denial to the camera-equipped wireless computing device (block 426). At this point, the user of the camera-equipped wireless computing device may attempt to repeat one or more steps of the connection process. Once connected, the camera-equipped wireless computing device may use the audience response application to interact with the centralized computing device and the audience response system.

In this manner, the camera-equipped mobile computing device may connect to a network, such as the Internet, and establish a direct connection, directly between the camera-equipped mobile computing device (such as camera-equipped mobile computing device 104 as illustrated in FIG. 1) and the central computing device (such as central computing device 110 as illustrated in FIG. 1). Making a direct connection in this way allows the camera-equipped mobile computing device and the central computing device to directly exchange information without the information being visible to users of other devices on the network. In another embodiment, the blocks of method 400 may be performed by different devices than those described. For example, the two-dimensional barcode may be created by the camera-equipped mobile device and scanned by the central computing device.

Figure 5:
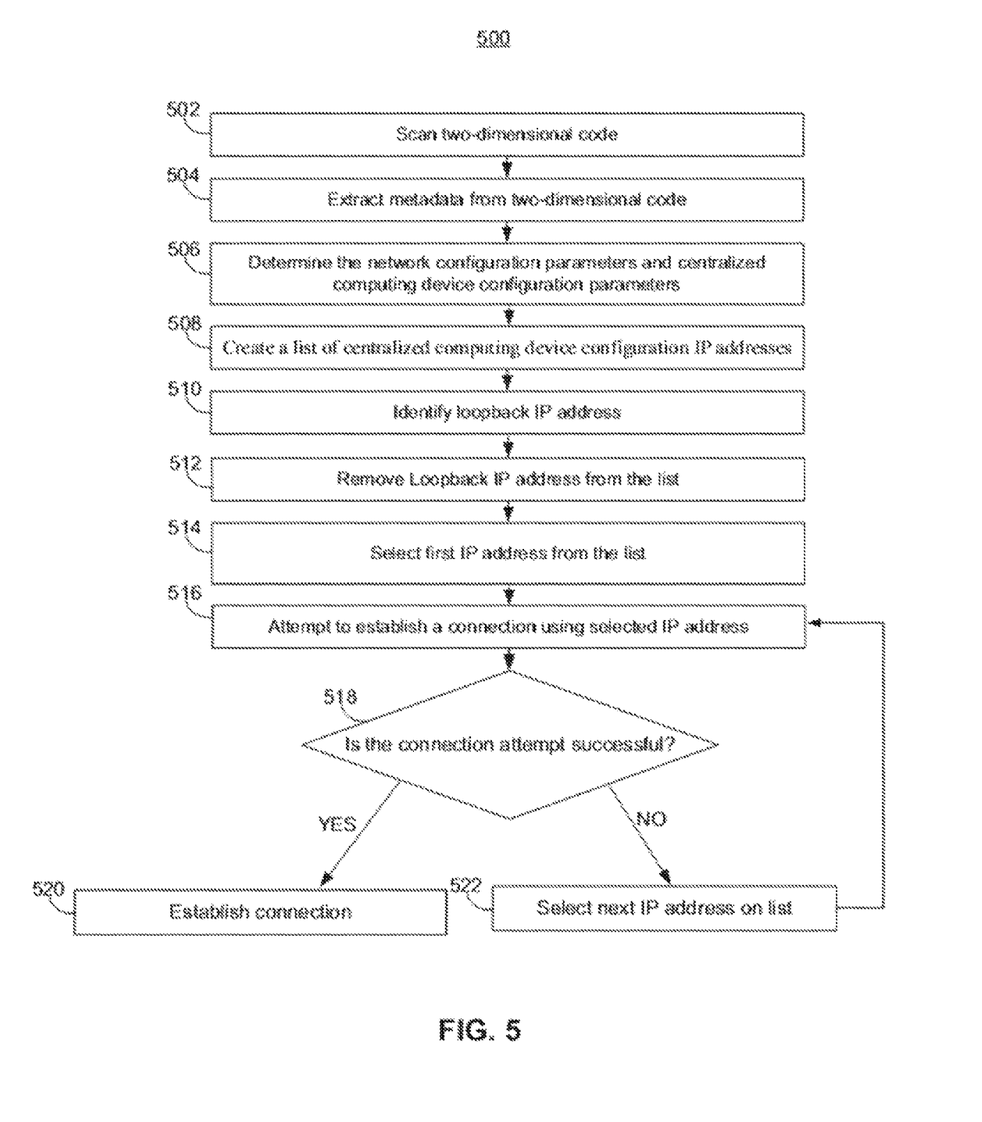
FIG. 5 is a flow chart illustrating an example method used by an audience response system of the present disclosure for choosing an Internet Protocol (IP) address from a plurality of IP addresses in order to synchronize a digital camera-equipped wireless computing devices with a centralized computing device.

FIG. 5 is a flow chart illustrating an example method used by an example audience response system for choosing an Internet Protocol (IP) address from a plurality of IP addresses in order to synchronize a digital camera-equipped wireless computing devices with a centralized computing device. For ease of explanation, FIG. 5 will be explained with reference to FIGS. 1-4. However, it will be understood that the example method 500 for configuring a camera-equipped wireless computing device for use in an audience response system can be utilized with systems and devices other than those illustrated in FIGS. 1-4.

In an embodiment, the centralized computing device may have multiple IP address and the camera-equipped computing device may attempt to connect using one or more IP addresses. After a two-dimensional code is displayed, the camera-equipped wireless computing device may use the camera functionality of the camera-equipped mobile computing device and the code recognition functionality of the audience response application to scan the two-dimensional code (block 502). After the wireless computing device scans the two-dimension code, the camera-equipped wireless computing device extracts metadata from the two-dimensional code (block 504) and determines the network configuration parameters and centralized computing device configuration parameters (block 506). In an embodiment the network configuration parameters may include one or more IP addresses, one or more ports, and one or more password hashes. Computers often have multiple IP addresses (such as one or more IP addresses for wireless connections, one or more IP addresses for wired connections and one or more Loopback wireless connections), and it may be advantageous to attempt a connection using one or more of the addresses.

Once the metadata has been extracted, the camera-equipped wireless computing device may create a list of configuration IP addresses (block 508). Each IP address on the configuration IP addresses list, may be an address which the camera-equipped wireless computing device may use to attempt to establish a direct connection to the centralized computing device. The camera-equipped wireless computing device may also identify one or more Loopback IP addresses (block 510) and remove the one or more loopback IP addresses from the list of configuration IP addresses (block 512). Loopback IP addresses are often an assigned address for a virtual interface used for administrative functions and an attempt by a camera-equipped wireless computing device to establish a direct connection using the Loopback IP address will be unsuccessful. The camera-equipped wireless computing device may then select the first IP address from list of configuration IP addresses (block 514) and attempt to establish a wireless connection using the first IP address (block 516). The camera-equipped wireless computing device may use, for example, the method 400 described in FIG. 4, to establish a connection with the centralized computing device.

If the connection attempt is successful (YES branch of block 518), then the connection is established (block 520). If the connection attempt is unsuccessful (NO branch of block 518), the camera equipped wireless computing device may select the next IP addresses on the configuration IP addresses list (block 522) and attempt to establish a connection using the selected IP address (516). The method 500 may be continued until the camera-equipped wireless computing device establishes a connection with the centralized computing device (block 520). In one embodiment (not shown), if the camera-equipped wireless computing device is unable to establish a connection after attempting to establish a connection using all of the IP addresses, the camera-equipped wireless computing device may return to the top of the list and continue attempting to establish a connection (block 516). In another embodiment, the camera-equipped mobile computing device may display an error message after a certain amount of connection attempts, or may display an error message after attempting to establish a connection using every IP address on the configuration IP addresses list. In yet another embodiment, the method 500 may be performed where there are multiple connection ports instead of or in addition to multiple IP addresses.

Figure 6:
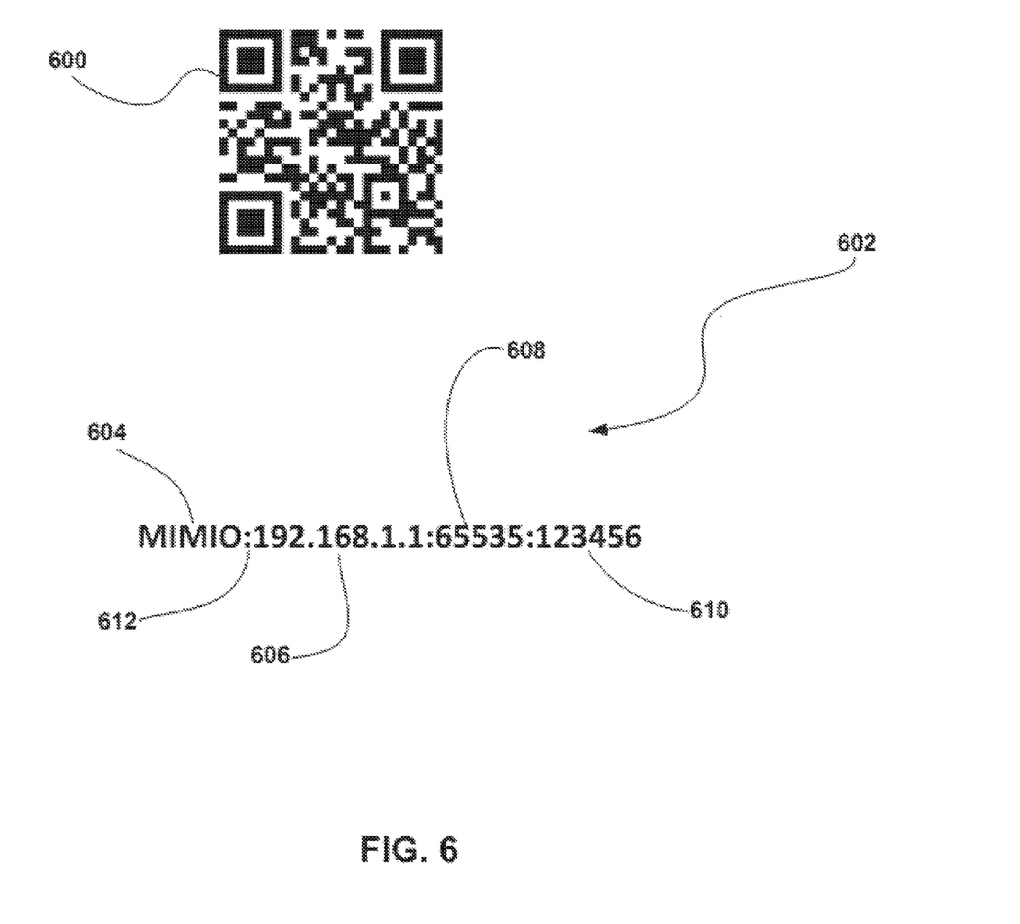
FIG. 6 illustrates an example two-dimensional code used for synchronizing a plurality of digital camera-equipped wireless computing devices to a centralized computing device.

FIG. 6 depicts a sample two-dimensional code 600 encoded with configuration parameters 602. The two-dimensional code may be a matrix barcode such as a quick response (QR®) code, or UPC two-dimensional code, otherwise known as a barcode, containing the network configuration parameters and centralized computing device configuration parameters or any other suitable two-dimensional or three dimensional code. Generally speaking, the two-dimensional code 600 may be scanned by a client device (such as the camera-equipped computing device 104 of FIG. 1) to connect to or for indentifying a host device on the network to connect to (such as the centralized computing device 110 of FIG. 1). The configuration parameters 602 may include network configuration parameters, such as a network ID field 604, an IP address field 606, and centralized computing device configuration parameters, such as a port field 608 and a password field 610. The network ID field 604, the IP address field 606, the network port field 608 and the network password field 610 may be separated by a colon 612 or some other acceptable character in plain text, a positional numeral system such as hexadecimal or in some other format. The network ID field 604 may be used for discovering a network (such as the wireless network 112 of FIG. 1) or the host device. The IP address field 606 may be used by the client device for indentifying a wireless network (such as the wireless network 112 of FIG. 1) to connect to or for indentifying the host device on the network to connect to (such as the centralized computing device 110 of FIG. 1). The port field 608 may be used by the client device for identifying an application or process running on the host device of the network (such as the centralized computing device 110 of FIG. 1) in order to establish a direct connection between the client device and host device. The password field 610 may define a password to be used by the client device to verify the client device's identity and/or to establish a direct connection with the host device. Those skilled in the art will recognize and appreciate that in alternate embodiments, the network ID 604 and the configuration parameters 602 may be of different lengths, that additional information may be encoded in the two-dimensional code 600 and that the configuration parameters 602 may encoded as plain text, a positional numeral system such as hexadecimal or in some other format. In one embodiment, configuration parameters 602 may include multiple IP addresses, such as one or more IP addresses for wireless connections, one or more IP addresses for wired connections and one or more Loopback wireless connections. Furthermore, the computing device configuration parameters 602 may be encrypted using one or more encryption methods.

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict example embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for segmenting a customer base and implementing specific behaviors for each customer segment through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for synchronizing a centralized computing device with camera-equipped wireless computing devices to facilitate interactive education activities within a wireless network, comprising:
   displaying, via a centralized computing device, a two-dimensional code containing configuration parameters comprising network configuration parameters and centralized computing device configuration parameters;
   receiving, at the centralized computing device, a connection request from the camera-equipped wireless computing devices based on an audience response application extracting the configuration parameters from the two-dimensional code and connecting to the wireless network; and
   establishing a direct connection with the camera-equipped wireless computing devices for synchronizing the camera-equipped wireless computing devices with the centralized computing device.

2. The method of claim 1, further comprising:
   determining, at the centralized computing device, whether to establish a connection with a particular one of the camera-equipped wireless computing devices; and
   if it is determined to establish a connection with the particular one camera-equipped wireless computing device, establishing, at the centralized computing device, a connection with the particular one camera-equipped wireless computing device.

3. The method of claim 1, wherein the two-dimensional code is a matrix two-dimensional code.

4. The method of claim 1, further comprising:
   receiving, at the centralized computing device, first data from a first camera-equipped wireless computing device and second data from a second camera-equipped wireless computing device; and
   wherein, the centralized computer device does not transmit the first data to the second camera-equipped wireless computing device.

5. The method of claim 1, further comprising discovering, by the camera-equipped wireless computing devices, a location of the centralized computing device on the wireless network based on the centralized computing device parameters.

6. The method of claim 1, wherein the network configuration parameters comprise one or more Internet protocol (IP) addresses for the wireless network, one or more network ports and one or more password hashes, the centralized computing device configuration parameters comprise a unique identifier (ID) for identifying the centralized computing device, and the network configuration parameters and the centralized computing device configuration parameters provide for establishing a direct connection between the centralized computing device and the camera-equipped wireless computing devices.

7. A method for synchronizing camera-equipped wireless computing devices with a centralized computing device to facilitate interactive education activities within a wireless network, comprising:
   scanning, at the camera-equipped wireless computing device, a two-dimensional code containing configuration parameters comprising network configuration parameters and centralized computing device configuration parameters;
   extracting, by an audience response application at the camera-equipped wireless computing device, the configuration parameters from the two-dimensional code;
   connecting to the wireless network based on the extracted configuration parameters;
   determining, at the camera-equipped wireless computing device, the location of a centralized computing device on a wireless network based on the configuration parameters;
   sending, from the camera-equipped wireless computing device, a connection request to the centralized computing device based on the extracted configuration parameters; and
   establishing a direct connection with the centralized computing device to synchronize the camera-equipped wireless computing device and other camera-equipped wireless computing devices with the centralized computing device.

8. The method of claim 7, further comprising, prior to scanning the two-dimensional code, displaying the two-dimensional code on a display within a viewing range of the camera-equipped wireless computing device.

9. The method of claim 8, wherein displaying the two-dimensional code includes the centralized computing device sending a command to cause a display device to display the two- dimensional code.

10. The method of claim 9, wherein the display device is one of an electronic whiteboard display or a large-screen monitor.

11. The method of claim 7, wherein the network configuration parameters comprise one or more Internet protocol (IP) addresses for the wireless network, one or more network ports and one or more password hashes, and the centralized computing device configuration parameters comprise a unique identifier (ID) for identifying the centralized computing device.

* * * * *